United States Patent
Dhayni

(10) Patent No.: US 9,306,627 B2
(45) Date of Patent: Apr. 5, 2016

(54) ACTIVE PASSIVE NEAR FIELD COMMUNICATION ANTI-COLLISION METHOD, INITIATOR AND TAG

(71) Applicant: STMicroelectronics International N.V., Amsterdam (NL)

(72) Inventor: Achraf Dhayni, Vallauris (FR)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 11 days.

(21) Appl. No.: 14/330,505

(22) Filed: Jul. 14, 2014

(65) Prior Publication Data

US 2015/0024682 A1      Jan. 22, 2015

(30) Foreign Application Priority Data

Jul. 19, 2013    (EP) .................................. 13368023

(51) Int. Cl.
*H04B 5/00*      (2006.01)
*H04B 7/00*      (2006.01)
*H04W 74/06*    (2009.01)

(52) U.S. Cl.
CPC .............. *H04B 5/0025* (2013.01); *H04W 74/06* (2013.01)

(58) Field of Classification Search
CPC .......... H04B 5/00; H04B 5/0025; H04B 5/02; H04B 5/0062; H04B 5/0075; H04B 5/0081; G06K 7/0008; G06K 7/10019; G06K 7/10198; G07C 9/00111; G07C 9/00309; G07C 9/00706
USPC ........ 455/41.2; 340/5.2, 5.8, 10.1, 10.3, 10.4, 340/10.42, 10.51; 370/445, 449
See application file for complete search history.

(56) References Cited

U.S. PATENT DOCUMENTS

| 6,173,323 | B1 | 1/2001 | Moghe | |
| 8,576,053 | B2 * | 11/2013 | Buscemi | G06K 7/10237 340/10.1 |
| 8,977,198 | B2 * | 3/2015 | Leutgeb | H04W 76/023 340/10.1 |
| 2013/0084798 | A1 * | 4/2013 | Faithorn | G06Q 20/3278 455/41.1 |

FOREIGN PATENT DOCUMENTS

EP      1662709 A1    5/2006

OTHER PUBLICATIONS

EPO Search Report for EP 13368023 mailed Feb. 21, 2014 (9 pages).
(Continued)

*Primary Examiner* — Quochien B Vuong
(74) *Attorney, Agent, or Firm* — Gardere Wynne Sewell LLP

(57) ABSTRACT

In near field communication between an active initiator and a plurality of passive listening devices, the initiator device obtains a unique identity code from each listening device using an initialization process. The initiator transmits a poll request signal including a sequence of coupled data including an identification vector and an allocation vector. Each listening device stores an embedded introduction vector. In response to receive of the poll request signal, the listening device compares each received introduction vector with its stored embedded introduction vector. If a match is found, the listening device calculates a time slot for transmission of its poll response signal based on the coupled allocation vector with the matched introduction vector. The time slot calculated will not overlap with any other time slot so that bit level collisions in the poll response signals will be avoided.

15 Claims, 5 Drawing Sheets

(56) References Cited

OTHER PUBLICATIONS

"NFC Activity Specification 1.0," Nov. 18, 2010, XP055059248, http://www.nfc-forum.org/specs/spec_license/document_form/custom_layout?1365423337032, retrieved on Apr. 11, 2013, p. 48, paragraph 7 (117 pages).

"NFC Digital Protocol Technical Specification NFC Forum," Nov. 17, 2010, XP055086545, http://cwi.unik.no/images/NFC_forum_digital_protocol.pdf, retrieved on Nov. 4, 2013, the whole document (194 pages).

Hillan, John: "Correction to NFC-A Collision Resolution Activity," Feb. 3, 2012, XP055059795, http:/222.nfc-forum.org/apps/group_public/download.php/11097/Qualcomm%20Input%20Paper%20on%20NFC-A%20Collision%20Resolution.docx, retrieved on Apr. 16, 2013, the whole document (6 pages).

\* cited by examiner

ACTIVE PASSIVE NEAR FIELD COMMUNICATION ANTI-COLLISION METHOD, INITIATOR AND TAG

PRIORITY CLAIM

This application claims priority from European Application for Patent No. 13368023.1 filed Jul. 19, 2013, the disclosure of which is incorporated by reference.

TECHNICAL FIELD

The present invention relates to near field communication (NFC) devices.

BACKGROUND

Near field communication is a wireless communication system operable to effect digital contactless communication between devices at a range of less than 20 cm and usually less than 10 cm and at a carrier frequency of 13.56 MHz. The specifications of methods and devices is mainly published by the NFC Forum (www.nfc-forum.org). Specifications published prior to the filing or priority date of this patent specification are hereby incorporated by reference.

In all NFC communications an initiator (reader) initiates communication by means of an initiation process. The initiation process starts by generating an RF field at 13.56 MHz. An NFC technology specific poll signal is then transmitted by the initiator. The poll response signal sets one or a sequence of timing slots in which to receive a poll response signal and waits for the first timing slot. The NFC listening devices within range, and of corresponding NFC technology, then respond to the poll signal with a poll response signal including the unique identification (UID) of the NFC listening device. The NFC listening device or devices may randomly select timing slots when there is more than one available. The initiation process is complete when the initiator has acquired the UID's of all the listening device in range the initiator is able to command data delivery from each or any specific device, one at a time and in an orderly sequence.

NFC uses only one carrier frequency and so communications between the initiator and listening device must be sequential to avoid interference (collision) between the signals.

NFC communications may be either passive or active. In passive communication the initiator generates the RF field. The listening device load modulates the existing RF field to achieve communication. Passive listening devices may be powered via the RF field and as with RFID devices have been used to tag items or people for many purposes. With active communication both the initiator and listening device generate an RF field. Embodiments herein concern passive communications.

NFC communications may occur between a dedicated device, that is to say devices such as a dedicated reader which is capable of acquiring data from a passive tag. However, smart electronic devices such as mobile (cell) phones, tablets, PDA's and lap top computers, provide an non-exhaustive and growing list of NFC enabled devices. Such devices are adapted in hardware and software to emulate either or both an NFC initiator device and an NFC listening device according to the instant wishes of the user. Embodiments herein apply to both dedicated and NFC enabled devices.

As a result of the proliferation of NFC devices it is increasingly common for an initiator to initiate a response from several listening devices in range. There is therefore a probability of a collision between the responses of the NFC listening devices which will corrupt each device UID or other parts of the response signal. NFC forum has technology specific anti-collision protocols which may allow the resolution of such collisions. For example NFC-A collision resolution is described in detail at the NFC Specification Activities Chapter 9.3.3 FIG. 7, collision resolution for NFC B is described at NFC Specification Activities Chapter 9.3.5 FIG. 8 and collision resolution for NFC-F is described at NFC Specification Activities Chapter 9.3.6 FIG. 9.

Collision resolution activities are either of (i) probabilistic or (ii) deterministic. In the former case the initiator sets a sequence of time slots during which a poll response signal can be received from an NFC listening device. Each activated NFC listening device randomly selects a time slot into which to respond. If and when a clear poll response is received with the NFC UID, the listening device identified by the initiator is commanded into a sleep mode unresponsive to the poll request signal. The process is repeated until no unidentified devices remain active. Because the process is probabilistic it can be prolonged and may fail.

The deterministic method starts by asking for the first number of the tag (a so called "Query Tree" algorithm) until it matches the tags then it continues to ask for additional characters until all tags within the region are found. This method is slow, and introduces a long identification delay but leads to fewer collisions, and has a 100 percent successful identification rate.

SUMMARY

In an embodiment, an NFC anti-collision method comprises the steps of: an NFC initiator device implementing an initiation process comprising the broadcast of a poll request signal; and at least one NFC listening device responsive to the poll request signal to transmit a poll response signal; the poll request signal including a sequence of introduction vectors each coupled to an allocation vector, and the or each NFC listening device receiving, reading and comparing each received introduction vector and to an embedded introduction vector and responsive to matching the received introduction vector and embedded introduction vector to transmit a poll response signal in accordance with timing determined by the allocation vector coupled to the matched received introduction vector.

Further, there is provided a system comprising an NFC initiator device and an NFC listening device, said initiator device having a controller to generate a poll request signal and a transmitter to generate an RF field and modulate the RF field to communicate the poll request signal during implementation of an initiation process and a receiver to sense modulation of the RF field and receive data; a controller to control the transmission, reception and generation of signals in accordance with machine readable code; an NFC listening device having a receiver to receive data from the RF field a transmitter to modulate the RF field to transmit a poll response signal to the initiator device in response to the initiation process and a controller to control the transmission, reception and generation of signals; the NFC initiator device controller is responsive to code to generate a poll request signal carrying a sequence of introduction vectors each coupled to a corresponding allocation vector and the NFC listening device controller is responsive to reception of each introduction vector to compare the received introduction vector to an embedded introduction vector recorded on the NFC listening device, and is responsive to matching the received and embedded introduction vectors to read the allocation vector, the controller processing the allocation vector to determine a time at which to communicate the poll response signal to the NFC initiator.

According to another aspect there is provided: an NFC initiator having: means to generate a poll request signal and a transmitter to generate an RF field and modulate the RF field to communicate the poll request signal during implementation of an initiation process and a receiver to sense modulation of the RF field and receive data; and a controller to control the transmission, reception and generation of signals in accordance with machine readable code, wherein that the controller is responsive to the machine readable code to generate a poll request signal comprising a sequence of introduction vectors each coupled to a respective allocation vector.

According to another aspect there is provided an NFC listening device having: a receiver to receive data from the RF field; a transmitter to modulate the RF field to transmit a poll response signal during an initiation process and a controller to control the transmission, reception and generation of signals; wherein the NFC listening device controller is responsive to reception of an introduction vector to compare the received introduction vector to an embedded introduction vector recorded on the NFC listening device, and is responsive to matching the received and embedded introduction vectors to read an allocation vector coupled to the respective introduction vector, the controller processing the allocation vector to determine a time at which to communicate a poll response signal to the NFC initiator.

The introduction vector is a signal described as a vector because it is convenient to express the signal as a vector matrix. However, the signal, like all NFC communications, will physically be a sequence of high and low amplitude modulations of the RF field encoding a binary, digital signal consisting of bytes of bits.

The allocation vectors transmitted from the initiator device are selected or calculated to ensure that the time slots determined for every poll response signal transmission do not overlap. As a result bit level collision between poll response signals is avoided.

In an alternative implementation of the method, system, initiator and listening device are modified so that the poll request signal comprises a sequence of introduction vectors each coupled to a corresponding allocation vector, with a response period between each initiation, vector couple. The listening device is modified to respond to an introduction vector match, by transmitting an acknowledgement signal during the response period. As a result the initiator will record that a listening device matching the introduction vector is present if an acknowledgement is received or absent if no acknowledgement is received. The acknowledgement will preferably comprise the matched introduction vector.

BRIEF DESCRIPTION OF THE DRAWINGS

Embodiments of a method, system, initiator and listening device embodying the present invention will now be described with reference to the accompanying illustrative figures in which.

DETAILED DESCRIPTION OF THE DRAWINGS

Figure 5:
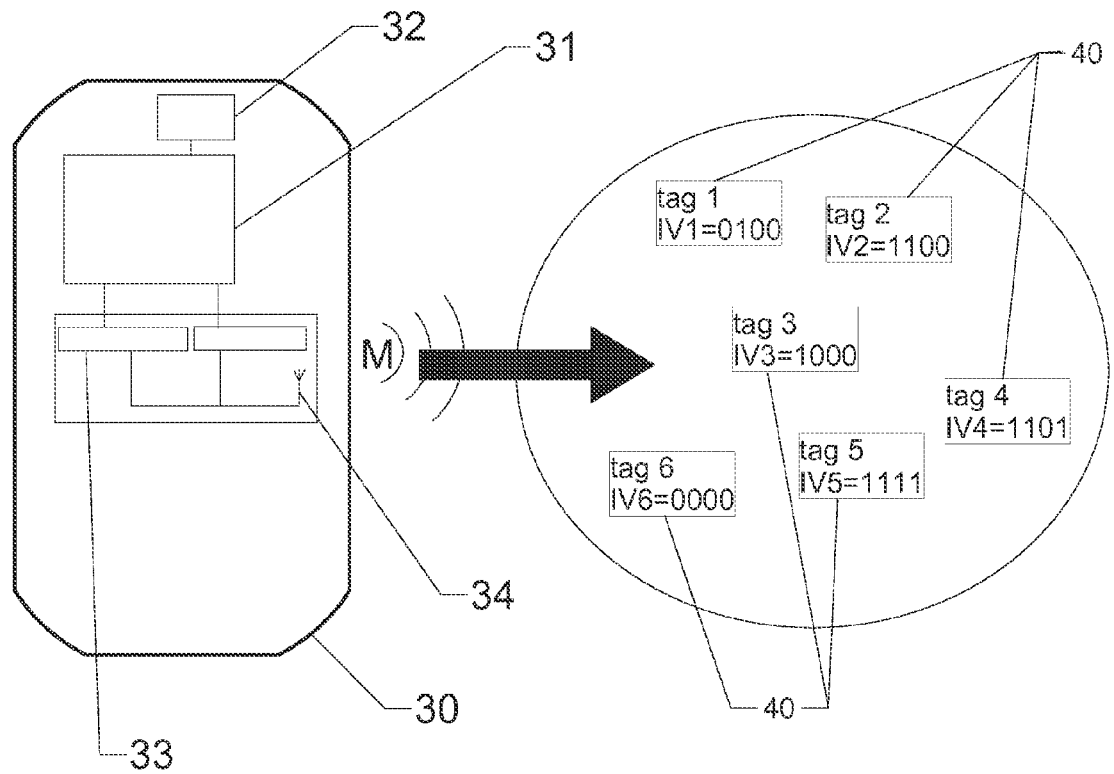
FIG. 5 illustrates an NFC enabled mobile phone acting as an NFC initiator device in the presence of multiple NFC listening devices (tags)

FIG. 5 shows an NFC enabled cell phone 30 is adapted to provide NFC initiator functionality by means of a controller 31 running code stored in a memory 32 to drive a transmitter 33 to generate and modulate a magnetic field via an antenna 34 at a carrier frequency of 13.56 MHz. Antenna 34 also receives signal via load modulation of the RF field M which is communicated to the controller 31 via a receiver 35.

Figure 6:
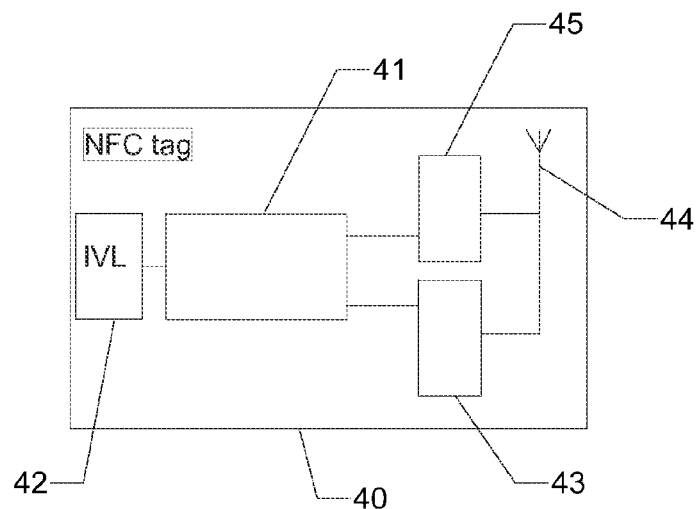
FIG. 6 illustrates an NFC listening device (tag).

FIG. 6 shows an NFC listening device 40, which may be another cell phone emulating a listening device. Listening devices are sometimes known as tags. The listening device 40 comprises a controller 41 controlled according to machine readable code retrieved from a memory 42. The controller 41 receives data via a receiver 43 and antenna 44 which can couple to the RF field M. The controller 41 can load modulate the RF field established by an initiator via a transmitter 44 in order to send data to the initiator.

In the broadcast example of FIG. 5 the initiator 30 is operating to establish communication in range of six NFC listening devices physically similar to the device of FIG. 6. Each NFC listening device memory stores an introduction vector IVL, as shown in the Table 1 below:

TABLE 1

| tag | introduction vector |
|---|---|
| 1 | 0100 |
| 2 | 1100 |
| 3 | 1000 |
| 4 | 1101 |
| 5 | 1111 |
| 6 | 0000 |

Figure 1:
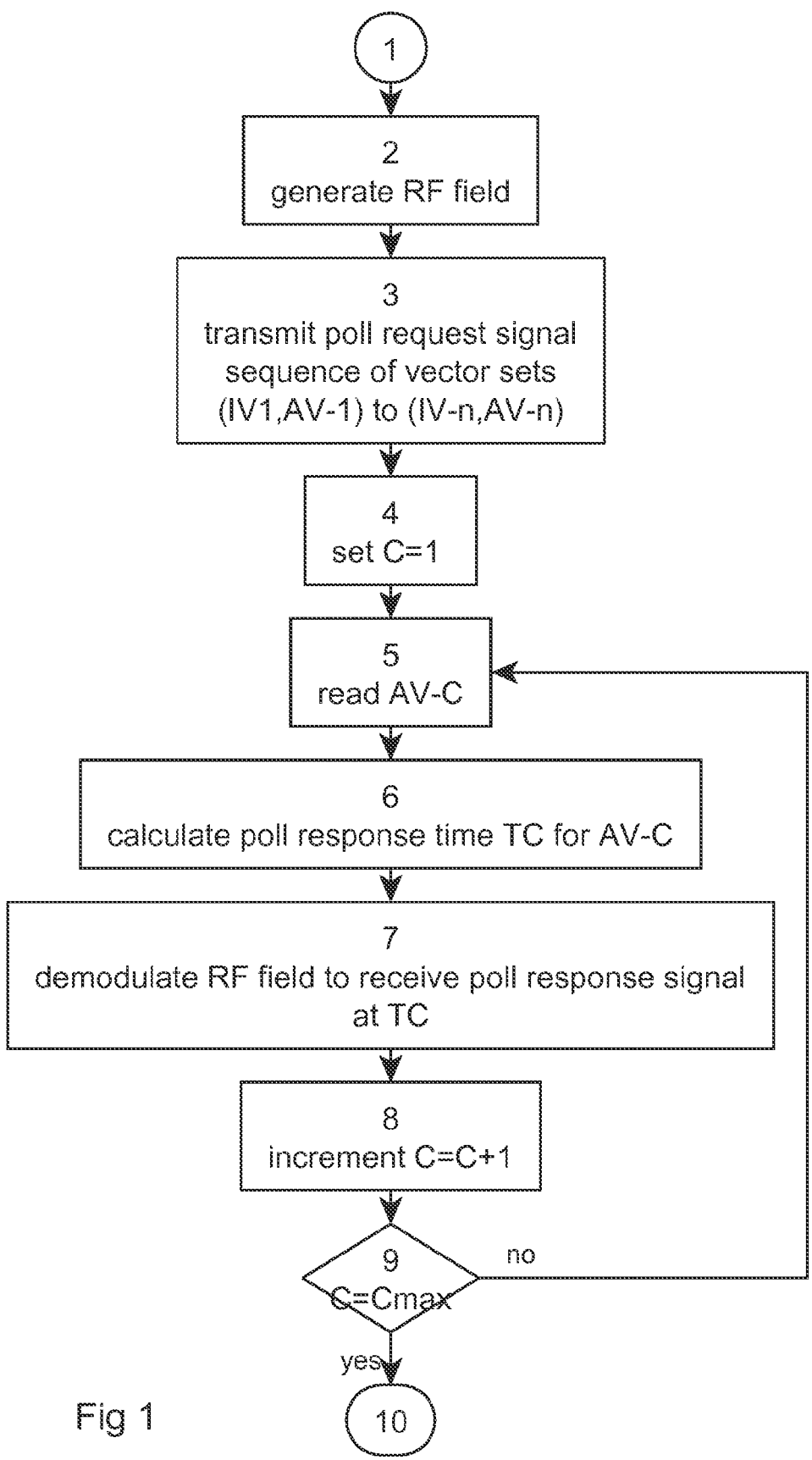
FIG. 1 is a flow chart illustrating a first embodiment of a method implemented by an NFC initiator.
Figure 2:
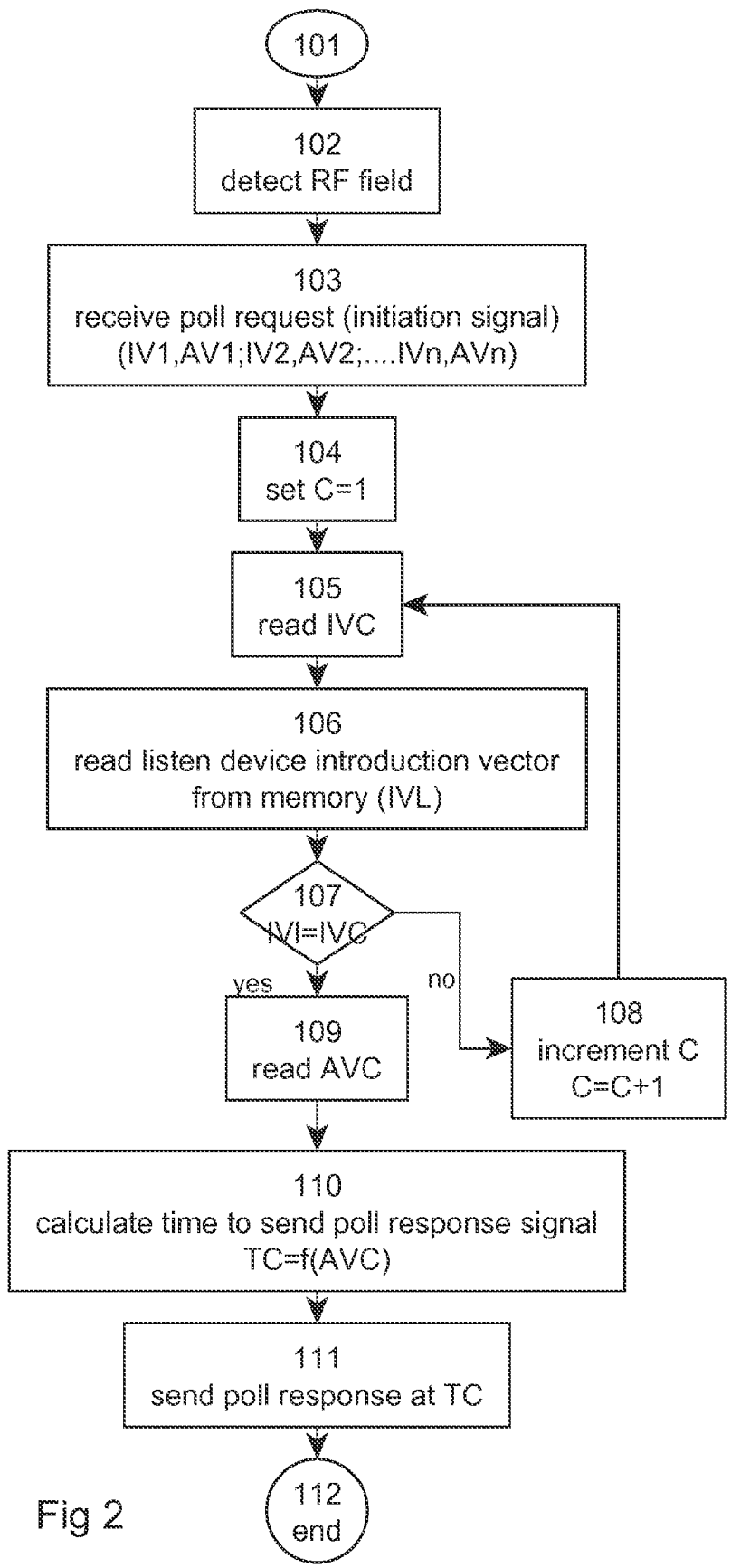
FIG. 2 is a flowchart illustrating the first embodiment implemented in an NFC listening device.

In the first embodiment as illustrated by FIG. 1 the user selects an application to initiate NFC communication at start step 1. In response the controller 31 drives the antenna to generate the RF field M at step 2. Tags 1 to 6 in range are activated and may be powered by the RF field to start the method illustrated in FIG. 2 at step 102. After a guard period the initiator implements step 3 in which a poll request signal is retrieved from the memory 32. In this case the poll request signal comprises a string formed of a set of introduction vectors, each coupled to one of a set of allocation vectors, represented generally as (IVC; AVC) where IVC is the Cth introduction vector and AVC is the Cth allocation vector. Specific examples are given below.

(0000; 15+G) (0001; 14G+T+2G) (0010; 13+2T+3G) (0011; 12+3T+4G) (0100; 11+4T+5G) (0101; 10+5T+6G) (0110; 9+6T+7G) (0111; 8+7T+8G) (1000; 7+8T+9G) (1001; 6+9T+10G) (1010; 5+10T+11G) (1011; 4+11T+12G) (1100; 3+12T+13G) (1101; 2+13T+14G) (1110; 1+14T+15G) (1111; 15T+16G)

The values of T and G are given below:

a) N is the number of Tags that want to communicate simultaneously with the Reader.

b) M is the maximum possible number of Tags that can communicate simultaneously with the Reader.

c) n is the number of bits that form each "introduction vector". To apply the method, n is chosen such that M=2n.

d) t is the maximum period of a complete communication between each Tag and the Reader.

e) T is the number of the tag timer periods (106 kbps) during t. This implies that T=106000*t. the 106 kbps of each nearby tag must be always active (powered by the field of the reader) during all the steps.

f) g is the guard interval between two consecutive communications.

g) G is the number of the tag timer periods (106 kbps) during g. This implies that G=106000*g.

h) s is the time of the "introduction sequence"

i) S is the number of the tag timer periods (106 kbps) during s. This implies that S=106000*s. The introduction sequence is a binary stream sent out by the initiator. It is a serial sequence of all existing introduction vectors separated by the time allocation (start and end of communication) that the initiator attributes to the designated tag. i.e. the number of bits that form the introduction sequence=M*n+N*b=2(n+1)+N*b, where b is the number of bits that form the "time allocation vector" sent by the reader to attribute the time allocation of the communication with the designated tag.

j) The time allocation vector=M−1−corresponding introduction vector+corresponding introduction vector*T+(corresponding introduction vector+1)*G.

In an equation form, the allocation vector is calculated as:

The time allocation vector=M−1−decimal value of the corresponding introduction vector+decimal value of the corresponding introduction vector*T+(decimal value of the corresponding introduction vector+1)*G For example, if we take the case of 0011-transponder, the time allocation vector=16−1−decimal value (0011)+decimal value (0011)*T+[decimal value (0011)+1]*G=16−1−3+3*T+[3+1]*G=12+3T+4G.

This ensures that the allocation vectors are calculated to ensure there is no overlap between any two calculated poll response time slots.

Each of tags 1 to 6 receives the whole poll request signal at step 103 including each introduction vector and allocation vector. Each tag then implements step 104 where a counter C is set to 1. At step 105 the Cth (1st) introduction vector is read from the poll request signal. At step 106 the embedded introduction vector pre-recorded on the listening device is read from memory 42. At step 107 the embedded introduction vector IVL is compared to the Cth introduction vector. If the vectors mismatch the method goes to step 108 and increments C by 1 before returning to step 105 to repeat the comparison loop to step 107.

If at step 107 the embedded introduction vector IVL matches the received introduction vector IVC, the listening device 42 reads the time allocation vector coupled with the matched introduction vector at step 109 and at step 110 calculates a time period TC in which to respond to the poll request signal. Because no two tags are embedded with the same introduction vector, and no two allocation vectors are the same, the calculated response times will each be different and the poll response signals will not collide. Specific examples of timing calculations based on the allocation vectors are given below:

The communication of 0000-transponder begins at the time EoS+G. i.e. G timer periods after the EoS. But this information is received (by the 0000-tranponder) 15 timer periods before the EoS. This implies that the 0000-transponder must wait 15+G.

The communication of 0001-transponder begins at the time EoS+T+2G. i.e. (T+2G) timer periods after the EoS. But this information is received (by the 0001-tranponder) 14 timer periods before the EoS. This implies that the 0001-transponder must wait 14+T+2G.

The communication of 0010-transponder begins at the time EoS+2T+3G. i.e. (2T+3G) timer periods after the EoS. But this information is received (by the 0001-tranponder) 13 timer periods before the EoS. This implies that the 0010-transponder must wait 13+2T+3G.

The communication of 0011-transponder begins at the time EoS+3T+4G. i.e. (3T+4G) timer periods after the EoS. But this information is received (by the 0001-tranponder) 12 timer periods before the EoS. This implies that the 0011-transponder must wait 12+3T+4G.

The initiator may calculate a sequence of periods, one for each allocation vector (AVC) sent in the poll request signal. This process is represented by step 4 setting C=1 to read the Cth (1st) allocation vector at step 5. The corresponding poll response start time TC is calculated at step 6. Generally the poll response time is measured from the start of the process. The period required for reception of a poll response is predetermined for any listening device. In order to facilitate reception of the poll response signal from the listening device the initiator demodulates the RF field at step 7.

At step 8 the value of C is incremented by one and if the maximum number of listening devices Cmax has not been reached the method goes back to step 5. If the maximum number of listening devices Cmax is reached the method ends.

Figure 3:
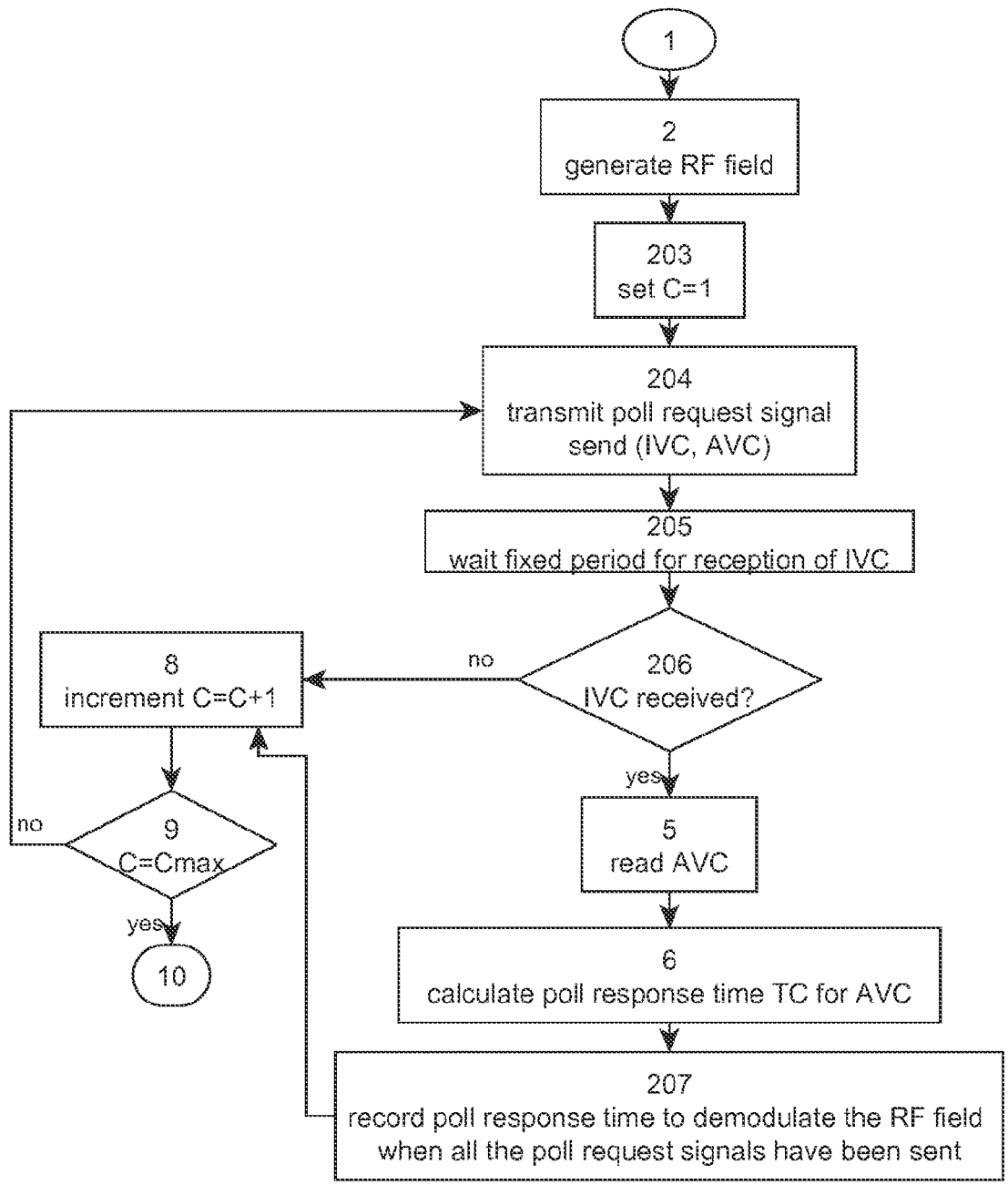
FIG. 3 is a flow chart illustrating a second embodiment of a method implemented by an NFC initiator.
Figure 4:
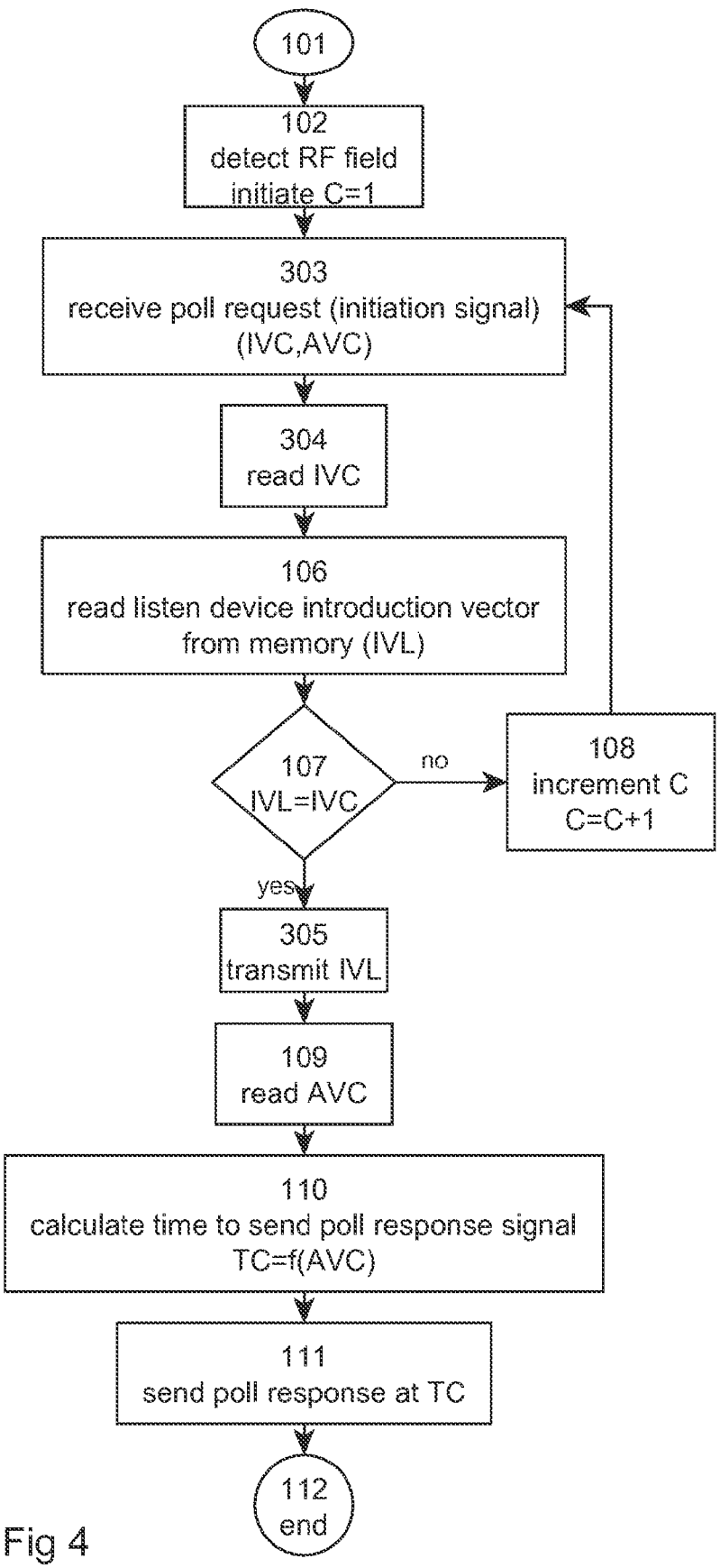
FIG. 4 is a flowchart illustrating the second embodiment implemented in an NFC listening device.

The second embodiment uses hardware physically similar to that of the first embodiment but modified by machine readable code to implement the method illustrated by FIGS. 3 and 4. The initiator 30 generates an RF field at step 2 as for the first embodiment, then at step 203 a counter initialises the value of the count "C" to 1. At step 204 the Cth coupled introduction vector and allocation vector are transmitted by modulating the RF field. The method then waits for a Cth response guard period sufficient to allow any active listening devices in range to respond.

Referring to FIG. 4, an active listening device is activated at step 102 by the presence of the RF field. At step 303 the listening device 40 receives the Cth poll request signal comprising the introduction vector IVC and the allocation vector AVC. At step 304 the listening device reads the received introduction vector. At step 106 the listening device reads the embedded introduction vector IVL from memory. At step 107 the received introduction vector is compared with the embedded introduction vector. If the introduction vectors are mismatched the method goes to step 108 where the value of C is incremented to C+1 and then to step 303 to await for a period, the reception of the next in the sequence of coupled introduction vectors and allocation vectors.

If the introduction vectors match at step 107 the method goes to step 309 where the controller drives the transmitter 45 to send the introduction vector IVL as an acknowledgement of the presence of the listening device. Thus an example of the signals at the initiation device is given below:

After the transmission of the Cth poll request signal the initiator 30 goes to step 205 to wait a specified guard time for reception of the Cth introduction vector. If no introduction vector is received during the limited reception period the method goes to step 8 where C is incremented to C+1. If the new value of C equals the maximum number of allowed listening device resolutions, the method ends, otherwise the method goes to step 204 again to send the new Cth value of introduction vector and allocation vector couple.

A sample representation of the transmission from the initiator is as follows:

(0000; 15+G) w1 (0001; 14G+T+2G) w2 (0010; 13+2T+3G) w3 (0011; 12+3T+4G) w4 (0100; 11+4T+5G) w5 (0101;

10+5T+6G) w6 (0110; 9+6T+7G) w7 (0111; 8+7T+8G). Where "w" represents the wait period at step 205.

Only when the initiator receives an introduction vector within the specified limited introduction vector reception period, the method goes to step 5 where the Cth allocation vector is read. At step 6 the poll response time for the Cth allocation vector is calculated from the allocation vector. At subsequent step 207 the poll response time is recorded for use in timing the demodulation of the RF field when all the poll request signals have been sent.

In the case of the listening device, after transmission of the introduction vector at step 305 the listening device reads the allocation vector at step 109 so that it can be used to calculate the timing TC for transmission of the poll response signal. At step 111 the poll response signal is sent when a timer indicates that the poll response time TN is reached.

The disclosed process obviates any need to keep the introduction vectors recorded on the initiation device to be kept current. It is only necessary to keep the length of the introduction vectors current by means of hardware or firmware. If, for example, the NFC initiator is used in an application where a maximum of 16 different tags (subscribers) can exist, then the introduction vector needs to be of 4-bit length. If for example the NFC initiator is used in an application where a maximum of 32 different tags (subscribers) can exist, then the introduction vector needs to be of 5-bit length. The length of the introduction vector is given according to this equation:

$$L = \text{ceiling}\{\text{Log 2(maximum number of tags)}\}.$$

L must be known to the initiator; it is soft coded (by firmware) in a register inside the initiator circuit.

For example, if L=4. The initiator can generate all possible 4-bit combinations (16 combinations) and send them one after the other during the introduction sequence as shown by the FIGS. 3 and 4 in the ID.

What is claimed is:

1. A near field communication (NFC) anti-collision method, comprising the steps of:
   broadcasting by an NFC initiator device a poll request signal in accordance with an initiation process, wherein the poll request signal includes a sequence of introduction vectors each coupled to an allocation vector;
   responding by at least one NFC listening device responding to the poll request signal to transmit a poll response signal;
   wherein responding comprises:
      receiving each introduction vector at the at least one NFC listening device;
      reading an embedded introduction vector stored in the at least one NFC listening device;
      comparing each received introduction vector to the embedded introduction vector stored in the at least one NFC listening device; and
      in response to a match of the received introduction vector and embedded introduction vector, transmitting a poll response signal in accordance with timing determined from the allocation vector coupled to the matched received introduction vector.

2. The method according to claim 1, further comprising waiting by the NFC initiator device, after the broadcast of the poll request signal, for a time period for reception of an acknowledgement from any NFC listening device matching the introduction vector, and then transmitting any next poll request signal coupling of introduction vector and allocation vector.

3. The method according to claim 2, further comprising calculating by the NFC initiation device of a reception time for the poll response signal with respect to an acknowledged allocation vector.

4. The method according to claim 3, wherein the acknowledgement signal indicates reception of the introduction vector.

5. A system, comprising:
   an near field communication (NFC) initiator device; and
   an NFC listening device,
   wherein said NFC initiator device comprises:
      a controller configured to generate a poll request signal and to control the transmission, reception and generation of signals;
      a transmitter configured to generate an RF field and modulate the RF field to communicate the poll request signal during implementation of an initiation process; and
      a receiver configured to sense modulation of the RF field and receive data;
   wherein said NFC listening device comprises:
      a receiver configured to receive data from the RF field;
      a transmitter configured to modulate the RF field to transmit a poll response signal to the initiator device in response to the initiation process; and
      a controller configured to drive the transmitter and receiver and control the transmission, reception and generation of signals;
   wherein said NFC initiator device controller is further configured to generate a poll request signal carrying a sequence of introduction vectors each coupled to a corresponding allocation vector; and
   wherein said NFC listening device controller is configured, responsive to reception of each introduction vector, to compare the received introduction vector to an embedded introduction vector (IVL) stored in NFC listening device and, in response to matching of the received and embedded introduction vectors, to read the allocation vector and process the allocation vector to determine a time at which to communicate a poll response signal to the NFC initiator device.

6. The system according to claim 5, wherein:
   the NFC initiator device controller is configured to transmit the poll request signal such that each coupled introduction vector and allocation vector is separated by a predetermined wait period for reception of an acknowledgement signal, and
   the NFC listening device controller is configured to respond to matching of the received and embedded introduction vectors to transmit an acknowledgement signal during the wait period.

7. The system according to claim 6, wherein:
   the NFC initiator device controller is configured to calculate timing of a time slot for reception of the poll response signal corresponding to a specific coupled introduction vector and allocation vector, only in response to reception of the acknowledgement signal within the wait period.

8. A near field communication (NFC) initiator device, comprising:
   a controller configured to control the transmission, reception and generation of signals including a poll request signal;
   a transmitter configured to generate an RF field and modulate the RF field to communicate the poll request signal during implementation of an initiation process;

a receiver configured to sense modulation of the RF field and receive data; and wherein the controller is further configured to generate the poll request signal comprising a sequence of introduction vectors each coupled to a respective allocation vector;

wherein the controller is configured to transmit the poll request signal such that each coupled introduction vector and allocation vector is separated by a predetermined wait period for reception of an acknowledgement signal.

9. The NFC initiator according to claim 8, wherein:
the controller is further configured to calculate timing of a time slot for reception of the poll response signal corresponding to a specific coupled introduction vector and allocation vector, only in response to reception of an acknowledgement signal within the wait period.

10. A near field communication (NFC) listening device, comprising:
a receiver configured to receive data from an RF field;
a transmitter configured to modulate the RF field to transmit a poll response signal during an initiation process; and
a controller configured to control the transmission, reception and generation of signals;
wherein the NFC listening device controller is configured, in response to reception of an introduction vector, to compare the received introduction vector to an embedded introduction vector stored in the NFC listening device, and read an allocation vector coupled to the respective introduction vector in response to matching of the received and embedded introduction vectors so as to determine a time at which to transmit a poll response signal the controller processing in response to the allocation vector.

11. The NFC listening device according to claim 10, wherein the controller is configured, in response to a received poll request coupling an introduction vector and an allocation vector and separated by a wait period, to compare each received introduction vector to the embedded introduction vector before the wait period expires and transmit an acknowledgement signal if the received introduction vector matches the embedded introduction vector.

12. The NFC listening device according to claim 11, wherein the controller is arranged to transmit the introduction vector as the acknowledgement signal.

13. A near field communication (NFC) anti-collision method, comprising the steps of:
broadcasting by an NFC initiator device a poll request signal in accordance with an initiation process, wherein the poll request signal includes a sequence of introduction vectors each coupled to an allocation vector;
responding by at least one NFC listening device responding to the poll request signal to transmit a poll response signal;
wherein responding comprises:
receiving, reading and comparing each received introduction vector to an embedded introduction vector each NFC listening device; and
in response to a match of the received introduction vector and embedded introduction vector, transmitting a poll response signal in accordance with timing determined from the allocation vector coupled to the matched received introduction vector;
waiting by the NFC initiator device, after the broadcast of the poll request signal, for a time period for reception of an acknowledgement from any NFC listening device matching the introduction vector, and then transmitting any next poll request signal coupling of introduction vector and allocation vector.

14. The method according to claim 13, further comprising calculating by the NFC initiation device of a reception time for the poll response signal with respect to an acknowledged allocation vector.

15. The method according to claim 14, wherein the acknowledgement signal indicates reception of the introduction vector.

* * * * *